(12) United States Patent
Dahan

(10) Patent No.: US 11,873,972 B2
(45) Date of Patent: Jan. 16, 2024

(54) SOLAR COACH LIGHT

(71) Applicant: LES PRODUITS SUNFORCE INC., Montreal-Ouest (CA)

(72) Inventor: Michael Dahan, Hampstead (CA)

(73) Assignee: LES PRODUITS SUNFORCE INC., Montréal-Ouest (CA)

( * ) Notice: Subject to any disclaimer, the term of this patent is extended or adjusted under 35 U.S.C. 154(b) by 0 days.

(21) Appl. No.: 17/733,192

(22) Filed: Apr. 29, 2022

(65) Prior Publication Data
US 2023/0073453 A1    Mar. 9, 2023

Related U.S. Application Data

(60) Provisional application No. 63/217,936, filed on Jul. 2, 2021.

(51) Int. Cl.
*F21S 8/00* (2006.01)
*F21S 9/03* (2006.01)
*F21V 21/02* (2006.01)

(52) U.S. Cl.
CPC .............. *F21S 8/036* (2013.01); *F21S 9/037* (2013.01); *F21V 21/02* (2013.01)

(58) Field of Classification Search
CPC .. F21V 21/26; F21V 23/0471; F21V 23/0464; F21V 3/02; F21V 2121/02;
(Continued)

(56) References Cited

U.S. PATENT DOCUMENTS

| 7,204,618 B1* | 4/2007 | Kuelbs | F21V 17/104 |
| | | | 362/35 |
| 8,194,061 B2 | 6/2012 | Wang et al. | |

(Continued)

FOREIGN PATENT DOCUMENTS

| CN | 202382152 | 8/2012 |
| EP | 1983632 | 11/2017 |

(Continued)

OTHER PUBLICATIONS

Machine translation of WO-2021110044-A1, retrieved from worldwide. espacenet.com on Feb. 22, 2023 (Year: 2023).*

(Continued)

*Primary Examiner* — Alicia M Harrington
*Assistant Examiner* — Steven Y Horikoshi
(74) *Attorney, Agent, or Firm* — Benoit & Cote Inc.; Charles-Andre Caron

(57) ABSTRACT

A solar coach light configured to be mounted to a wall comprises a bracket to be mounted to the wall and a light fixture. The bracket comprises a mounting plate and an arm extending therefrom. The light fixture comprises a plurality of top faces and a bottom face defining together an enclosure; a solar panel mounted to one of the top faces; a battery cell housed by the enclosure; a socket mounted to the bottom face to plug a light bulb therein; and a removable shade assembly mounted to the bottom face comprising a plurality of removable shades. The removable shade assembly defines a space surrounding the bottom face providing protection from the environment. The solar coach light comprises a hanging assembly connecting the light fixture to the arm distant from the mounting plate.

19 Claims, 10 Drawing Sheets

(58) Field of Classification Search
CPC .......... F21V 17/002; F21V 15/02; F21V 1/02; F21V 1/04; F21S 8/033; F21S 9/032; F21S 8/036; F21S 9/037; F21W 2131/107
See application file for complete search history.

(56) References Cited

U.S. PATENT DOCUMENTS

| | | | |
|---|---|---|---|
| 8,514,094 B2 | 8/2013 | Richmon | |
| D766,489 S * | 9/2016 | Moon | D26/87 |
| D830,610 S * | 10/2018 | Amato | D26/87 |
| 10,670,203 B1 * | 6/2020 | Glazer | F21V 17/002 |
| D910,897 S | 2/2021 | Liu | |
| 10,910,833 B2 | 2/2021 | Ellenberger | |
| D938,641 S | 12/2021 | Liang | |
| 11,258,298 B2 | 2/2022 | Motsenbocker | |
| 2010/0008077 A1 | 1/2010 | Ponamar | |
| 2010/0098488 A1 | 4/2010 | Huck et al. | |
| 2011/0032695 A1 * | 2/2011 | Cumberland | H05B 47/11 362/183 |
| 2012/0091900 A1 | 4/2012 | Fournier | |
| 2013/0257276 A1 * | 10/2013 | Asato | H05B 47/10 315/88 |
| 2014/0049942 A1 | 2/2014 | Chilton et al. | |
| 2014/0218901 A1 * | 8/2014 | Richmond | G10K 1/07 362/183 |
| 2017/0051903 A1 * | 2/2017 | Maglica | F21V 23/0492 |
| 2017/0059130 A1 * | 3/2017 | Sittner | F21S 9/037 |
| 2019/0078761 A1 * | 3/2019 | Harper | F21V 23/02 |

FOREIGN PATENT DOCUMENTS

| | | | | |
|---|---|---|---|---|
| GB | 2454963 | | 5/2009 | |
| WO | WO2010049661 | | 5/2010 | |
| WO | WO-2021110044 A1 * | | 6/2021 | F21V 17/12 |

OTHER PUBLICATIONS

Amazon Canada, "Solar Outdoor Wall Lanterns with Motion Sensor, Upgrade Dusk to Dawn LED Lights with 3 Lighting Modes, Wireless Exterior Solar Wall Sconce for Garden Yard Entryway Garage, IP65 Waterproof", https://www.amazon.ca/-/fr/dext%C3%A9rieur-cr%C3%A9puscule-d%C3%A9clairage-ext%C3%A9rieure-%C3%A9tanch%C3%A9it%C3%A9/dp/B098T5SMTT/ref=sr_1_11?_mk_fr_CA=%C3%85M%C3%85%C5%BD%C3%95%C3%91&crid=2KHOHJAASNZ0I&keywords=solar%2Bcoach%2Blight&qid=1648211812&sprefix=solar%2Bcoach%2Blight%2Caps%2C97&sr=8-11&th=1&language=en_CA, (retrieved on Jun. 13, 2022).

* cited by examiner

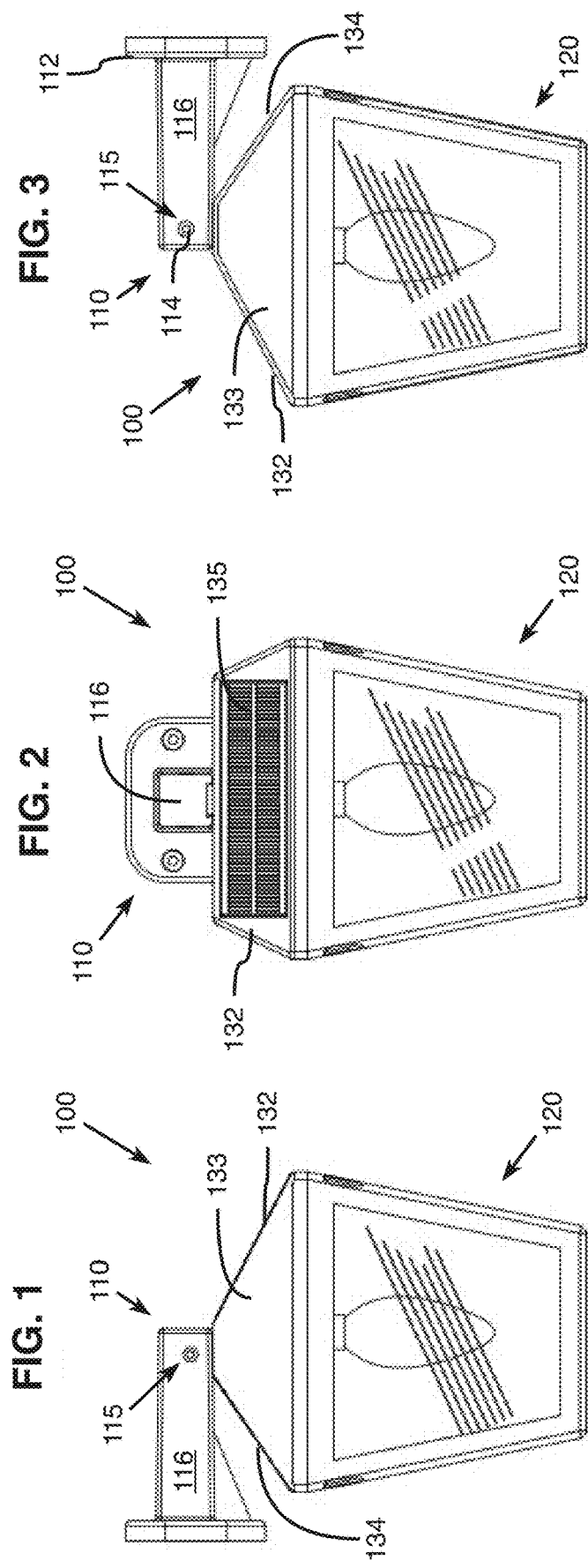

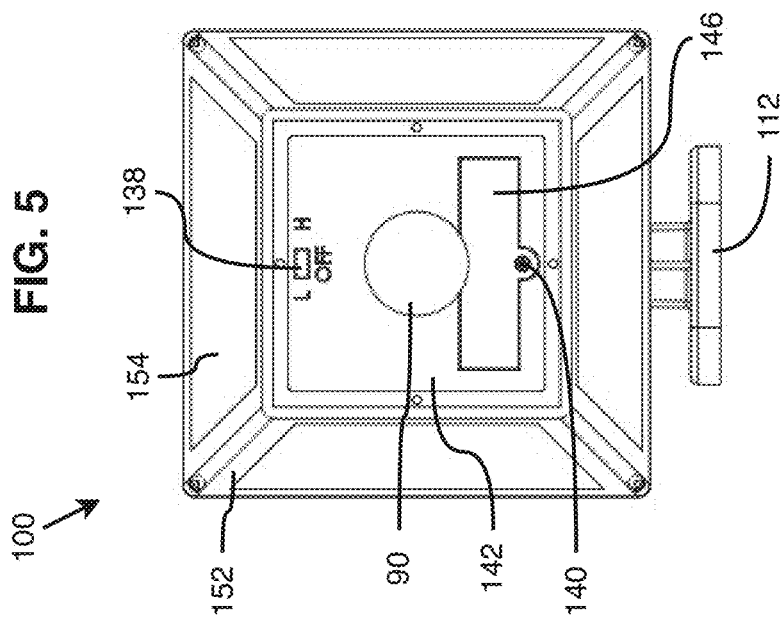
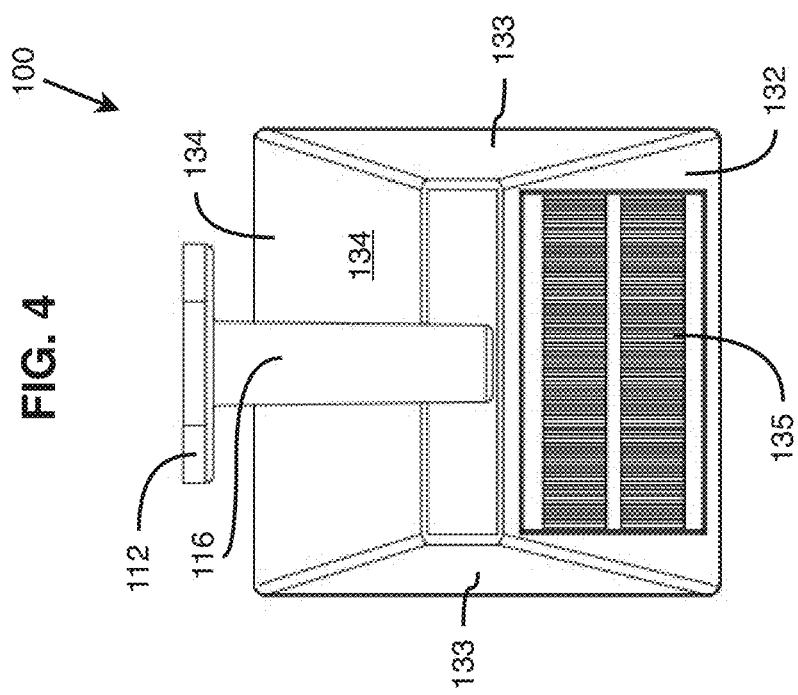

FIG. 16

SOLAR COACH LIGHT

CROSS-REFERENCE TO RELATED APPLICATION

This application claims priority from U.S. provisional patent application 63/217,936 filed Jul. 2, 2021, the specification of which is hereby incorporated herein by reference in its entirety.

BACKGROUND (a) Field

The subject matter disclosed generally relates to lights and fixtures. More particularly, the subject matter disclosed relates to wall-mounted light fixtures.

(b) Related Prior Art

In the field of light fixtures, and particularly wall-mounted light fixtures and ceiling-mounted light fixtures, there has been development over the years to provide more flexible light fixtures through some of these fixtures not requiring to be connected to the electric grid. Improvements were made in the power source, the lightbox mounting solutions, the lightbox controls and other aspects related thereto.

There is therefore a need for improvement in exterior light fixtures not connected to the grid.

SUMMARY

In some aspects, the techniques described herein relate to a solar coach light including: a bracket to be mounted to a support surface, the bracket including a mounting plate and an arm extending therefrom; a light fixture including: a plurality of top faces and a bottom face defining together an enclosure; a solar panel mounted to one of the top faces; a battery cell housed in the enclosure; a socket mounted to the bottom face to plug a light bulb into, the socket electrically connected to the solar panel and the battery cell; and a removable shade assembly mounted to the bottom face including a plurality of removable shades, the removable shade assembly defining a space surrounding the bottom face providing protection from the environment; and a hanging assembly connecting the light fixture to the arm distant from the mounting plate.

In some aspects, the techniques described herein relate to a solar coach light, wherein the plurality of top faces includes a front face to which the solar panel is mounted, the front face being sloped relative to a horizontal plane.

In some aspects, the techniques described herein relate to a solar coach light, wherein the plurality of top faces includes at least one other face, wherein the front face has a greater area than the at least one other face.

In some aspects, the techniques described herein relate to a solar coach light, wherein the removable shade assembly including a bottom opening.

In some aspects, the techniques described herein relate to a solar coach light, wherein the removable shade assembly includes a frame on which the removable shades are removably mounted.

In some aspects, the techniques described herein relate to a solar coach light, wherein the frame has one of a groove, a lip and a blade configured to limit inward displacement of the removable shades relative to the frame.

In some aspects, the techniques described herein relate to a solar coach light, wherein the frame has a proximal periphery including a series of first segments, the proximal periphery being configured to be mounted to the bottom face, and a distal periphery including a series of second segments, and wherein the second segments are narrower than the first segments.

In some aspects, the techniques described herein relate to a solar coach light, wherein the removable shades have a trapezoidal shape.

In some aspects, the techniques described herein relate to a solar coach light, wherein the removable shade assembly includes a cap mounted to the proximal periphery of the frame.

In some aspects, the techniques described herein relate to a solar coach light, further including blades mounted to the cap configured to butt up against the removable shades toward the distal periphery and outwardly.

In some aspects, the techniques described herein relate to a solar coach light, wherein the shade assembly shields the light bulb from the environment over its entire periphery according to a horizontal plane.

In some aspects, the techniques described herein relate to a solar coach light, further including a PCB housed in the enclosure, and a switch connected to the PCB, wherein the switch allows to set an operating condition for the solar coach light.

In some aspects, the techniques described herein relate to a solar coach fight, further including a PCB housed in the enclosure and electrically connected to the solar panel, the PCB including means configured to sense an energy level generated by the solar panel, where the PCB is configured to route energy between the solar panel, the battery cell and the socket based on the sensed energy level.

In some aspects, the techniques described herein relate to a solar coach light, wherein the hanging assembly includes an inset and an opening having a common shape, wherein inserting the inset in the opening provides a rigid interface.

In some aspects, the techniques described herein relate to a solar coach light including: a bracket to be mounted to a support surface, a light fixture configured to be releasably mounted to the bracket, the light fixture including: a plurality of top faces and a bottom face defining together an enclosure, a single solar panel; a battery cell housed in the enclosure; a socket mounted to the bottom face to plug a light bulb into, the socket electrically connected to the single solar panel and the battery cell; and a shade assembly mounted to the bottom face including a plurality of shades, the shade assembly defining a space surrounding the bottom face providing protection from the environment, wherein the plurality of top faces includes a front face configured to be most distant to the support surface, the front face having an area greater than other ones of the plurality of top faces, and the single solar panel being mounted to the front face.

In some aspects, the techniques described herein relate to a solar coach light, wherein the shade assembly includes a proximal periphery removably mounted to the bottom face, and a distal periphery providing a bottom opening to access the bottom face.

In some aspects, the techniques described herein relate to a solar coach light, wherein the shade assembly includes a frame on which the shades are removably mounted.

In some aspects, the techniques described herein relate to a solar coach light, further including a PCB housed in the enclosure, and a switch connected to the PCB, wherein the switch allows to set an operating condition for the solar coach light.

In some aspects, the techniques described herein relate to a solar coach light, further including a rubber cover covering a switch portion outside the enclosure and extending within the enclosure to cover at least partially another switch portion inside the enclosure thereby protecting the switch from the environment.

In some aspects, the techniques described herein relate to a solar coach light including: a bracket to be mounted to a support surface, a light fixture configured to be releasably mounted to the bracket, the light fixture including: a plurality of top faces and a bottom face defining together an enclosure; and a solar panel providing electrical power to the light fixture; and a hanging assembly connecting the light fixture to the bracket, the hanging assembly including an inset and an opening having a common shape, wherein inserting the inset in the opening provides a rigid interface whereby a center of gravity of the light fixture is not vertically aligned with the inset while still maintaining a desired vertical orientation of the light fixture.

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which:

FIG. 1 is a left side view of a solar coach light in accordance with an embodiment;

FIG. 2 is a front side view of the solar coach light of FIG. 1;

FIG. 3 is a right side view of the solar coach light of FIG. 1;

FIG. 4 is a top side view of the solar coach light of FIG. 1;

FIG. 5 is a bottom side view of the solar coach light of FIG. 1;

FIG. 16 is a perspective view of the bottom face of the top assembly of a light fixture;

It will be noted that throughout the appended drawings, like features are identified by like reference numerals.

DETAILED DESCRIPTION

Figure 7:
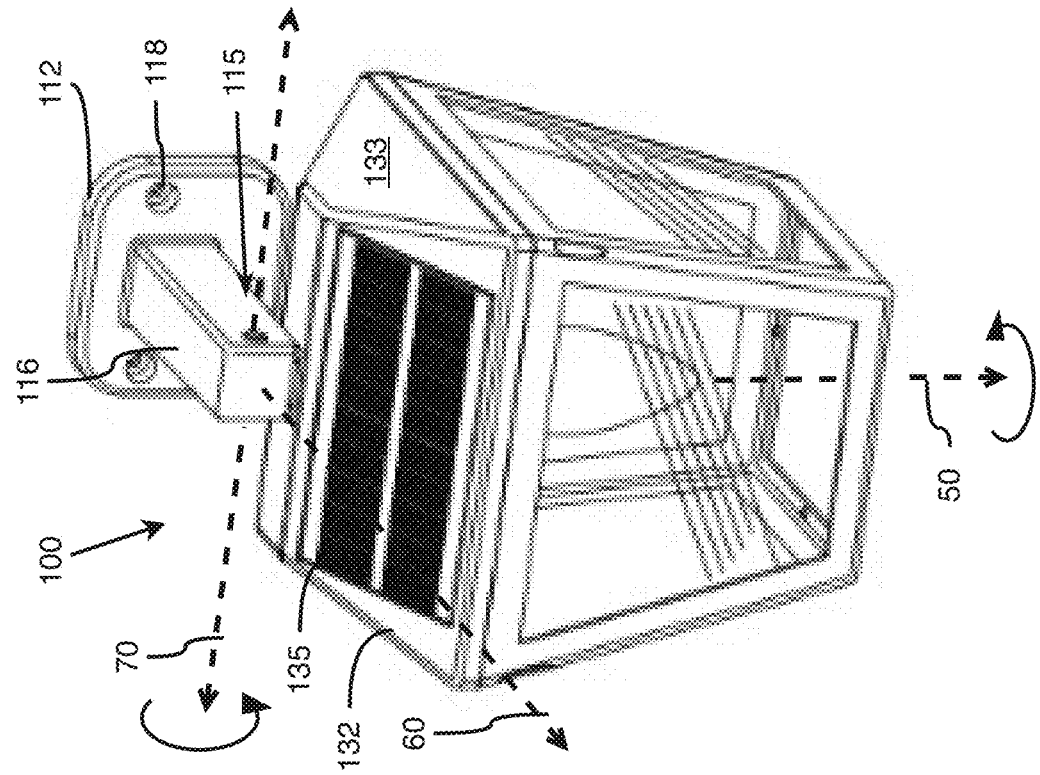
FIG. 7 is an elevated perspective view from 20 degrees from the right and 20 degrees of elevation of the solar coach light of FIG. 1.
Figure 6:
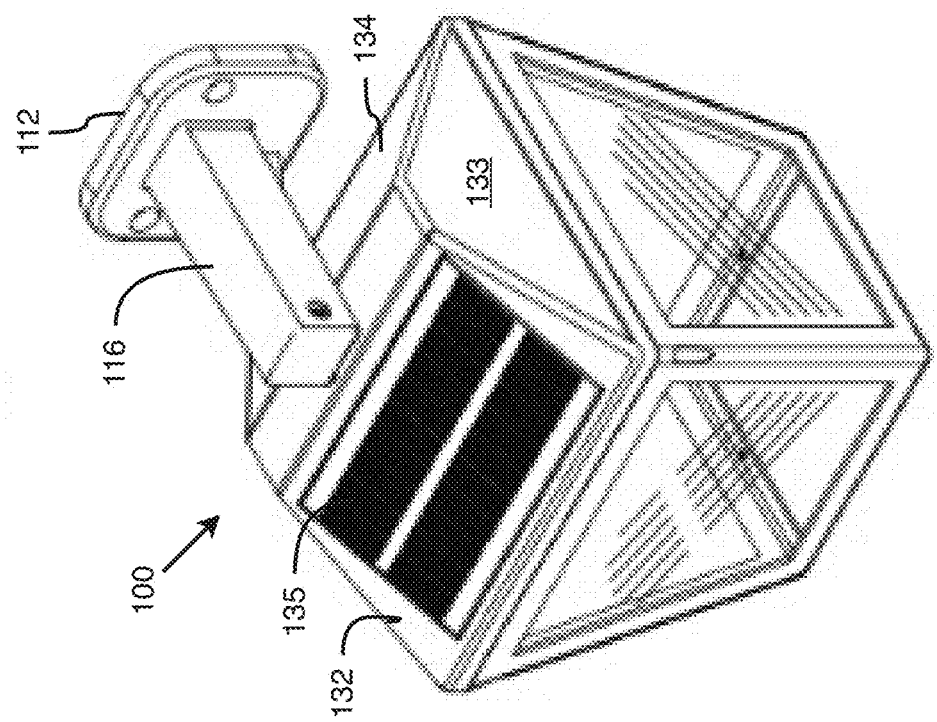
FIG. 6 is an elevated perspective view from 45 degrees from the right and 45 degrees of elevation of the solar coach light of FIG. 1.

The realizations will now be described more fully hereinafter with reference to the accompanying figures, in which realizations are illustrated. The foregoing may, however, be embodied in many different forms and should not be construed as limited to the illustrated realizations set forth herein.

With respect to the present description, references to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values and of values herein or on the drawings are not intended to be limiting, referring instead individually to any and all values falling within the range, unless otherwise indicated herein, and each separate value within such a range is incorporated into the specification as if it were individually recited herein. The words "about", "approximately", or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described realizations. The use of any and all examples, or exemplary language ("e.g.," "such as", or the like) provided herein, is intended merely to better illuminate the exemplary realizations and does not pose a limitation on the scope of the realizations. No language in the specification should be construed as indicating any unclaimed element as essential to the practice of the realizations. The use of the term "substantially" is intended to mean "for the most part" or "essentially" depending on the context. It is to be construed as indicating that some deviation from the word it qualifies is acceptable as would be appreciated by one of ordinary skill in the art to operate satisfactorily for the intended purpose.

In the following description, it is understood that terms such as "first", "second", "top", "bottom", "above", "below", and the like, are words of convenience and are not to be construed as limiting terms.

The terms "top", "up", "upper", "bottom", "lower", "down", "vertical", "horizontal". "interior" and "exterior" and the like are intended to be construed in their normal meaning in relation with normal installation of the product, with normal installation of the components being depicted on FIGS. 1 to 11.

It should further be noted that for purposes of this disclosure, the terms "coupled" and "connected" mean the joining of two members directly or indirectly to one another.

Such joining may be stationary in nature or movable in nature and/or such joining may allow for the flow of electricity, electrical signals, or other types of signals or communication between two members. Such joining may be achieved with the two members or the two members and any additional intermediate members being integrally formed as a single unitary body with one another or with the two members or the two members and any additional intermediate members being attached to one another. Such joining may be permanent or alternatively removable or releasable.

Referring now to the drawings, and more particularly to FIGS. 1 to 7, a solar coach light 100 is designed to be mounted to a stable surface such as a ceiling or a wall (wherein FIGS. 1 to 7 depicts the solar coach light 100 to be installed on a wall not depicted), with the solar coach light 100 designed have the sun directed thereto at least part of the day.

The solar coach light 100 is normally mounted to an exterior wall through a bracket 110 comprising a mounting plate 112, an arm 116 extending thereto, and a pin 114 on the arm 116 that is distant from the mounting plate 112. According to embodiments, the pin 114 may be replaced, for example, with a bolt and nut assembly, or with one or more screws screwed to the inset 122 through the arm 116.

According to embodiments, the mounting plate 112 comprises holes 118, where screws (not depicted) are used to mount the mounting plate 112 to the exterior wall.

The light fixture 120 comprises on its top an inset 122 that when coupled to the pin 114, provides a hanging assembly 115 through which the light fixture 120 hangs (relative to a pitch axis 70, see FIG. 7) from the bracket 110.

Figure 9:
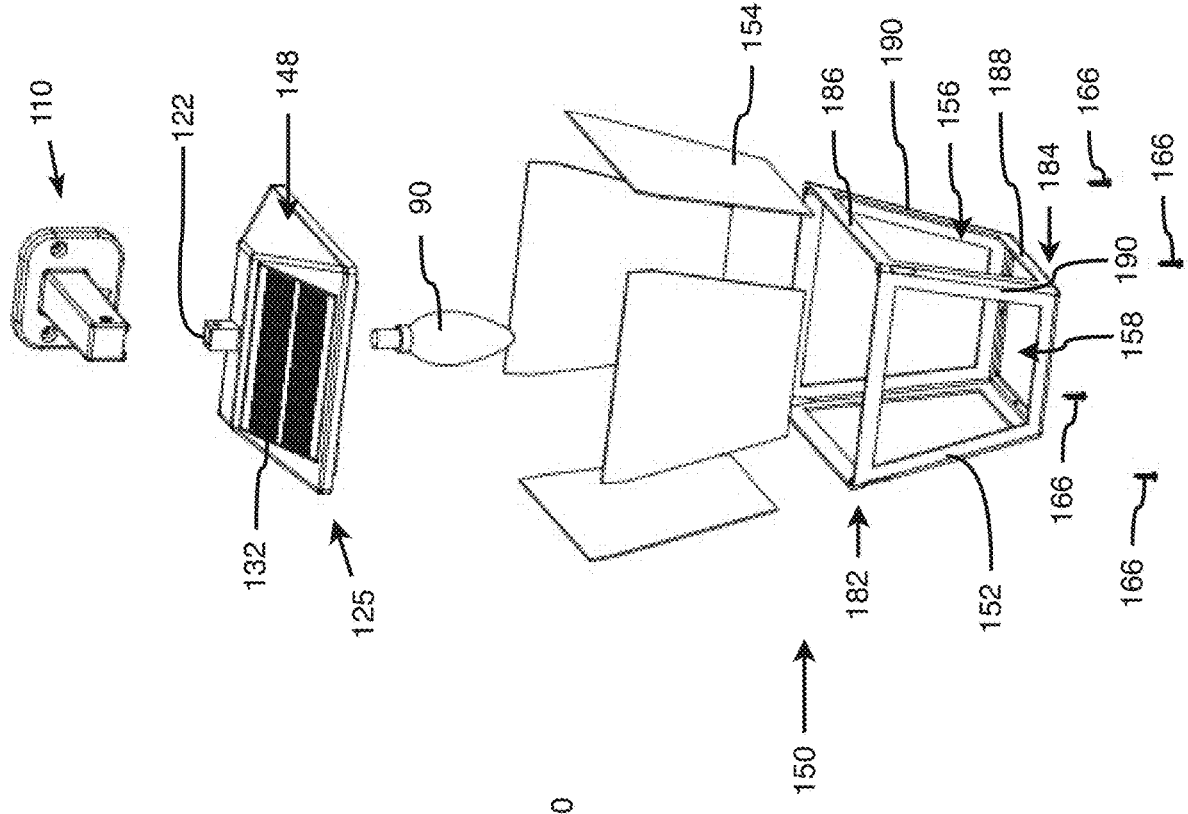
FIGS. 8 and 9 are respectively an elevated perspective view assembled and exploded of the solar coach light of FIG. 1.
Figure 8:
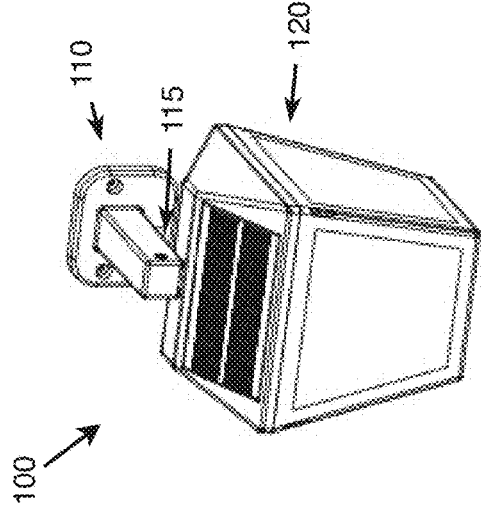
Figure 11:
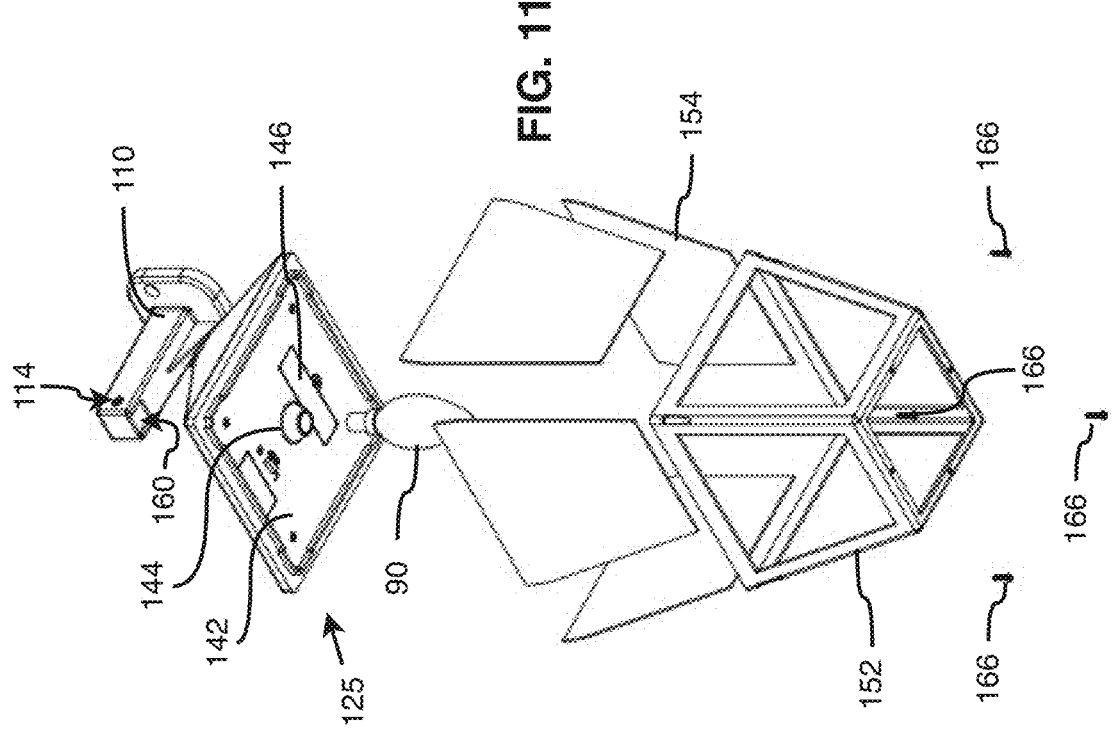
FIG. 11 is an exploded perspective view from the right-bottom of the solar coach light of FIG. 1.
Figure 10:
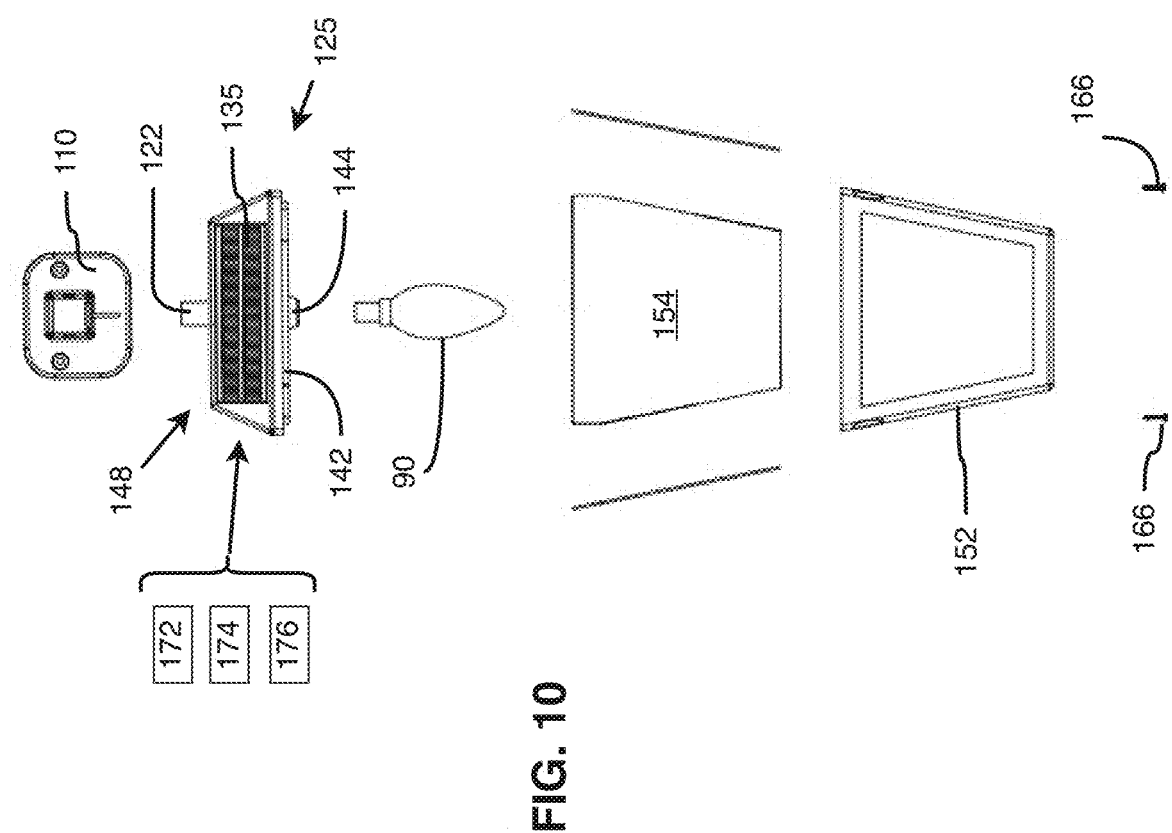
FIG. 10 is a front exploded view of the solar coach light of FIG. 1.
Figure 13:
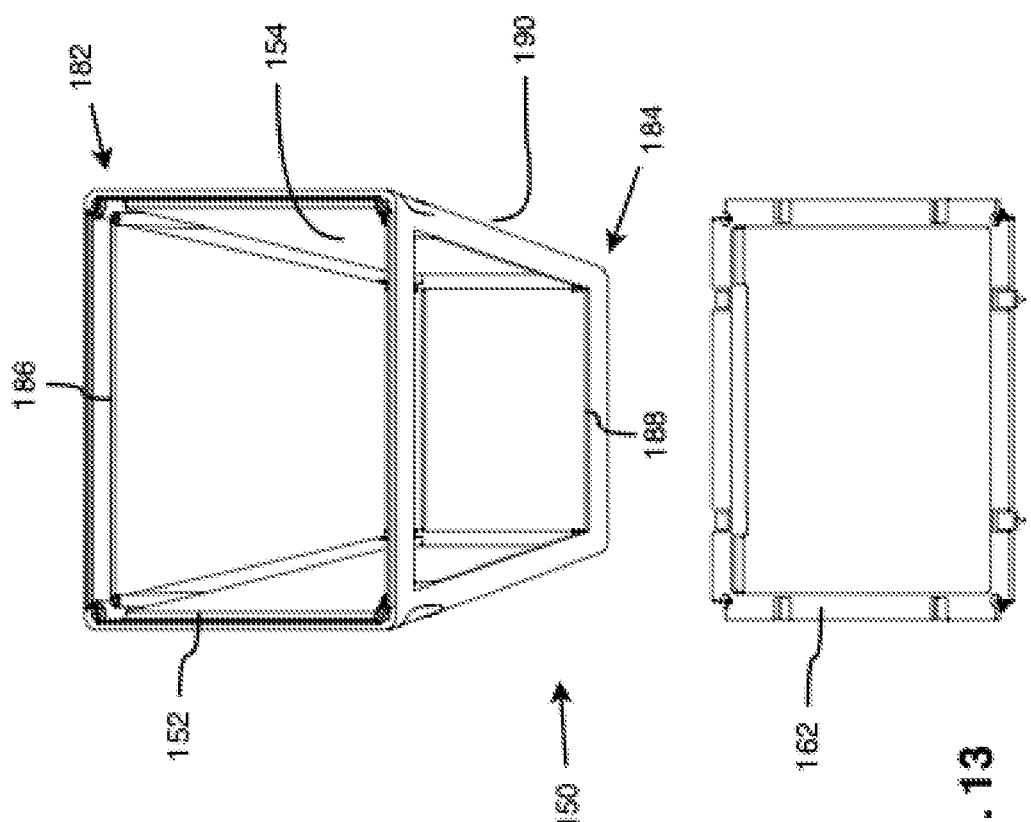
FIG. 13 is a perspective view from the top of the shade assembly of FIG. 12 with the cap removed with its top visible.
Figure 12:
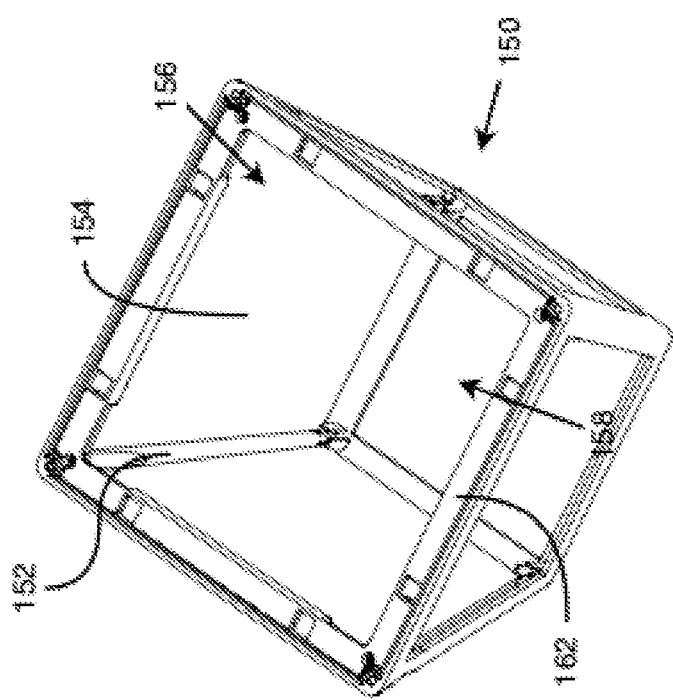
FIG. 12 is a perspective view from the top of the shade assembly comprising a cap.
Figure 15:
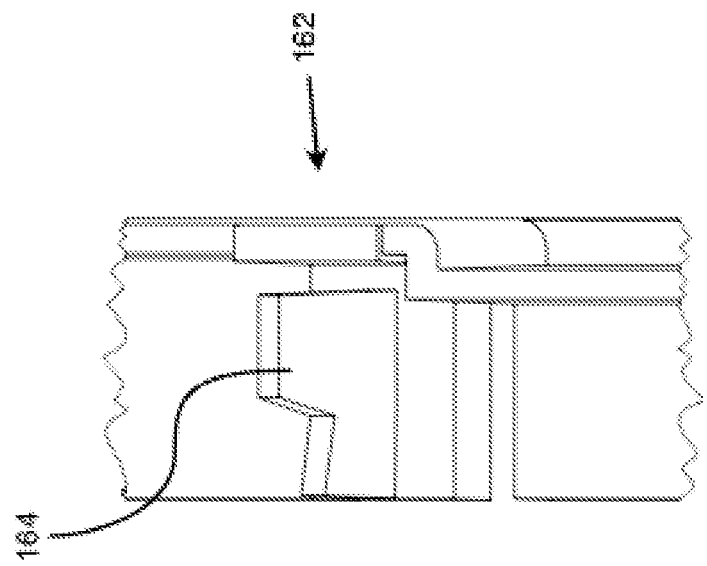
FIG. 15 is a closeup perspective view of a portion of the cap of FIG. 14 depicting a blade configured to butt up against a shade.
Figure 14:
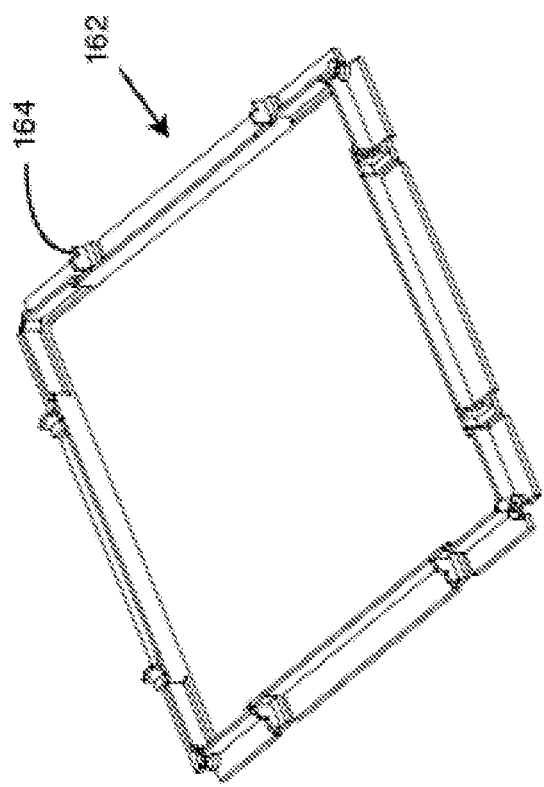
FIG. 14 is a perspective view of the bottom face of the cap of the shade assembly of FIG. 12.
Figure 17:
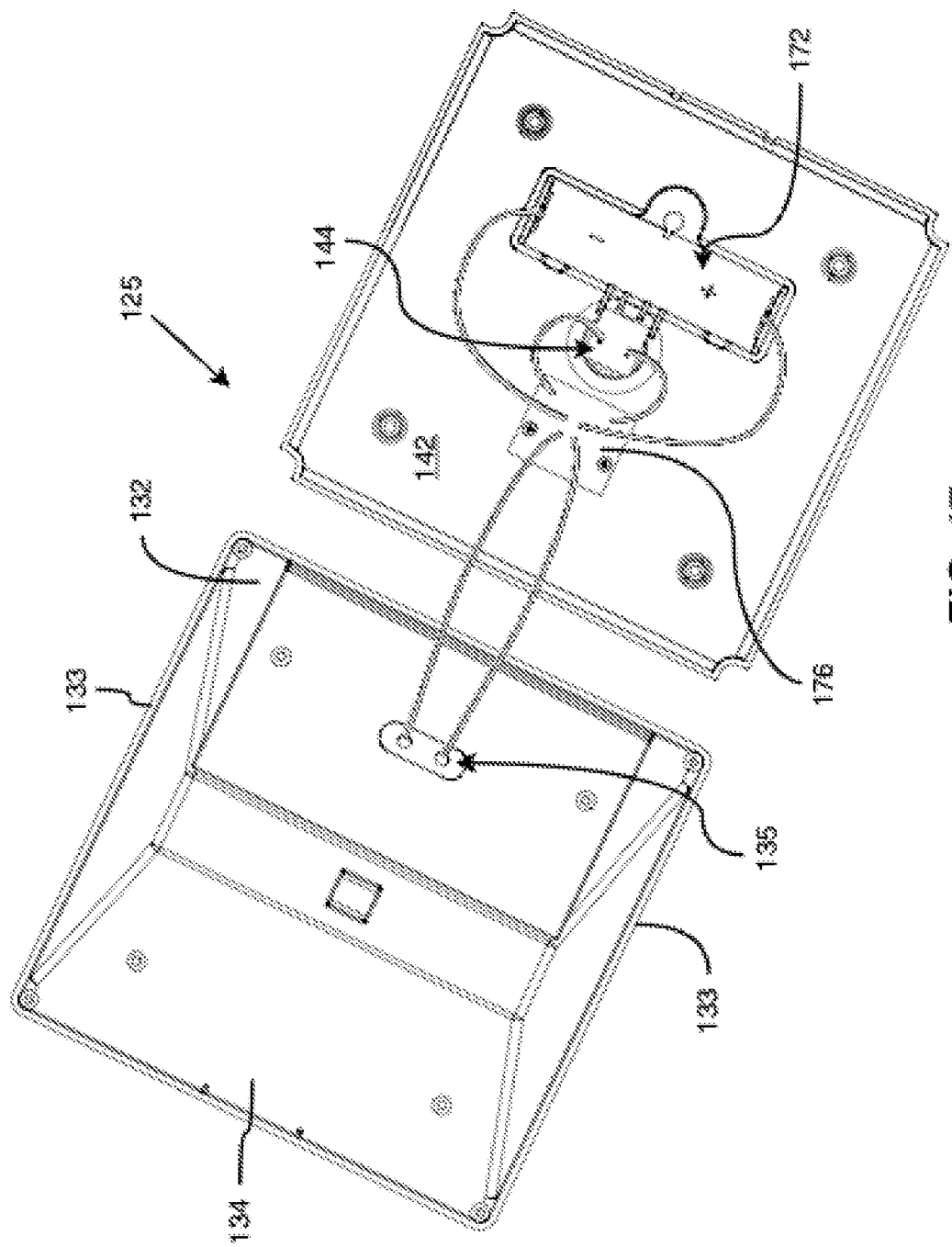
FIG. 17 is a perspective view of the interior of the top assembly of FIG. 16.

According to an embodiment depicted through FIGS. 9 and 11 the arm 116 has downward facing opening 160 (FIG. 11) having a shape marrying the shape of the inset 122 (i.e., the opening 160 and the inset 122 have common shape), resulting in the assembly being rigid, keeping the fixture from wobbling.

According to another embodiment (not depicted), the shapes of the openings 160 and of the inset 122 provide some clearance therebetween parallel to the pin 114, allowing the inset 122 to rotate within a range of angles around the pin 114.

The present document also contemplates alternative hanging assemblies providing solutions for hanging the light fixture 120 from the bracket 110, wherein some hanging assemblies, like the one depicted on FIGS. 1 to 7, allow the light fixture 120 to hang according to a preset yaw angle (yaw axis 50 on FIG. 7), in other words facing in a preset direction, while other hanging assemblies provide additional configurations, for example to the light fixture 120 to rotate freely relative to the yaw axis 50 (i.e., within a range of, e.g., 130 degrees) according to an axis passing through the inset 122, or to be configurable to face the desired angle relative to yaw axis (with the longitudinal orientation of the arm 116 roll axis 60 as depicted can be considered 0 degrees). Other alternative hanging assemblies allow limiting the pitch rotation, as depicted on FIGS. 1 to 7, the light fixture 120 to be used with relatively horizontally mounted bracket 110, or either a horizontally or vertically mounted bracket 110.

The present document further contemplates motorized embodiments wherein the light fixture 120 is driven to rotate around the yaw axis 50 during the day for maximizing lighting of the light fixture 120 by the sun.

Referring to FIGS. 1 to 18, the light fixture 120 comprises a removable shade assembly 150 adapted to be mounted to the light fixture 120.

The shade assembly 150 is designed to surround a portion of the space under the light fixture 120, namely the surrounding of the light bulb 90, protecting the space and providing the diffusing or other desired function when light passes through the shades 154.

The shade assembly 150 comprises a frame 152 mounted at its top, aka proximal periphery 182, to the light fixture 120, covering the four sides of the light fixture 120, aka its entire periphery according to a horizontal plane. The shade assembly 150 features a bottom opening 158, limited by the distal periphery 184, providing easy access to the interior space while keeping the interior space and particularly the bottom face 142 of the light fixture 120 relatively protected from weather conditions.

The frame 152 features windows 156 limited at the top by a segment 186 of the proximal periphery 182, at the bottom by a segment 188 of the distal periphery 184, and one the sides by the edges 190 of the frame 152, with the shades 154 mounted to the frame 152 closing the windows 156.

According to a preferred embodiment, the proximal periphery 182 and the distal periphery 184 feature the same number of segments 186, 188, and define a regular polygon (e.g., square, pentagon, etc.).

According to an embodiment, the frame 152 features grooves (not identified) on each side of the windows 156, wherein the shades 154 when mounted are sled down in a pair of side grooves until the shades 154 are abutting the bottom of the frame 152.

According to an embodiment, the frame 152 features grooves or retaining portions at the bottom of the windows 156, where the shades 154 are abutting and thereby providing an aid in maintaining the shades in position in the frame 152.

According to an embodiment (depicted through FIGS. 12 and 13), the frame 152 features a cap 162 at the top mounted to the frame 152 through resilient members, closing the path of the shades 154 out of the frame 152 when mounted thereto. The cap 162, according to embodiments, may feature a groove or a blade 164 pushing the shades downward and outwardly toward the frame 152 when mounted thereto. The features of the frame 152, the trapezoid narrower bottom shape of the shades 154 to be inserted in the frame 152, and the cap 162 combine into a shade retaining feature limiting potential vibration of the shades 154 when the wind blows and allowing to replace the shades 154 with shades featuring a different texture, a different level of transparency or to easily engrave a shade 154 out of the frame and afterwards to mount to the shade 154 in the frame 152.

According to embodiments, shade-maintaining features such as the grooves may be molded as part of the frame 152 or of the cap 162. Alternatively, metallic blades may be inserted/wedged in place or mounted to the cap 162 or frame 152 with screws and pressing outwardly against the bottom portion of the shades 154 to maintain them in place.

According to a preferred realization, the frame 152 is mounted to the bottom face 142 of the top assembly 125 of the light fixture 120 with screws 166.

According to an alternative realization (not depicted), the frame 152 and the bottom face 142 of the top assembly 125 are assembled through at least four resilient flaps interfacing with lips or slots on the other part. Once assembled, the flaps grip the lips/slots until the flaps are compressed or forced away from the lips.

Referring to FIGS. 1 to 18, the light fixture 120 comprises the inset 122 mounted on top, and a series of sloped faces comprising a front sloped face 132, two side faces 133 and a rear face 134. The front sloped face 132, the side faces 133 and the rear face 134 are designed for the front sloped face 132 to have an almost rectangular area greater than each of the areas of the side faces 133 and the rear face 134. It results in a front sloped face 132 optimized to mount a solar panel 135 thereto, and more precisely a combined sensor and solar panel 135 (when considered in combination with the PCB 176) operating both as a solar panel to generate electric current when sunlit and an ambient light sensor through sensing of the current/voltage, aka energy, generated by the solar panel 135 and routing the energy accordingly from the solar panel 135 to the battery cell 172, or from the battery cell 172 to the socket 144 and thus the light bulb 90. Thereby, the light fixture 120 may optimize the light directed to a single solar panel 135 while minimizing the number of solar panels to one (1) and the electronic components associated therewith. The solar panel 135 is sealed in place, providing no opening for the rain to enter in the solar coach light 100 therethrough. The front sloped face 132 is adapted with the optimal angle for the latitude they are intended to be used. For instance, for a latitude of 42 degrees North, the slope of the front face is between 35 and 40 degrees. The light fixture 120 also comprises other sloped faces 133, 134, aka remaining faces, defining together with front sloped face 132 a pyramid-like set of top walls. The slope of other sloped faces 133, 134 is designed to allow rain to pour down the faces 133, 134.

It is worth noting that the rigid mounting of the inset 122 to the arm 116 allows to set a greater area to the front sloped face 132 resulting in the center of gravity of the top assembly 125 and shade assembly 150 the center of gravity of the light fixture 120) being in front of the pin 114 (the center of gravity of the light fixture 120 is not vertically aligned with the inset 122) while still maintaining the desired vertical orientation to the light fixture 120.

The light fixture 120 comprises a bottom face 142 defining with the sloped faces 132, 133, 134 an enclosure 148 wherein a rechargeable battery cell (not depicted) housed in a battery compartment 192 and controls 174 are secured. The enclosure 148 further houses a Printed Circuit Board (PCB) 176 connected to the solar panel 135, the rechargeable battery cell 172 and the socket 144, wherein the PCB 176 is adapted to manage the power of the solar coach light 100, namely:
to manage the storage of power in the rechargeable battery cell 172 when the sun lights up the solar panel 135; and
to power up the light bulb 90 according to the position the user selects for the switch 138 when the solar panel 135 detects that ambient light is under a trigger level.

The light fixture 120 comprises on the bottom face 142 a switch 138 connected to the PCB 176 and operable by the user to set the solar coach light 100 in one of a plurality of possible configurations, wherein the available configurations are e.g., Off, Low intensity wherein the solar coach light 100 is configured to provide a dimmed lighting, and a High In some aspects, the techniques described herein relate to a solar coach light including: a bracket to be mounted to a support surface, the bracket including a mounting plate and an arm extending therefrom; a light fixture including: a plurality of top faces and a bottom face defining together an enclosure; a solar panel mounted to one of the top faces; a battery cell housed in the enclosure; a socket mounted to the bottom face to plug a light bulb into, the socket electrically connected to the solar panel and the battery cell; and a removable shade assembly mounted to the bottom face including a plurality of removable shades, the removable shade assembly defining a space surrounding the bottom face providing protection from the environment; and a hanging assembly connecting the light fixture to the arm distant from the mounting plate.

In some aspects, the techniques described herein relate to a solar coach light, wherein the plurality of top faces includes a front face to which the solar panel is mounted, the front face being sloped relative to a horizontal plane.

In some aspects, the techniques described herein relate to a solar coach light, wherein the plurality of top faces includes at least one other face, wherein the front face has a greater area than the at least one other face.

In some aspects, the techniques described herein relate to a solar coach light, wherein the removable shade assembly including a bottom opening.

In some aspects, the techniques described herein relate to a solar coach light, wherein the removable shade assembly includes a frame on which the removable shades are removably mounted.

In some aspects, the techniques described herein relate to a solar coach light, wherein the frame has one of a groove, a Hp and a blade configured to limit inward displacement of the removable shades relative to the frame.

In some aspects, the techniques described herein relate to a solar coach light, wherein the frame has a proximal periphery including a series of first segments, the proximal periphery being configured to be mounted to the bottom face, and a distal periphery including a series of second segments, and wherein the second segments are narrower than the first segments.

In some aspects, the techniques described herein relate to a solar coach light, wherein the removable shades have a trapezoidal shape.

In some aspects, the techniques described herein relate to a solar coach light, wherein the removable shade assembly includes a cap mounted to the proximal periphery of the frame.

In some aspects, the techniques described herein relate to a solar coach light, further including blades mounted to the cap configured to butt up against the removable shades toward the distal periphery and outwardly.

In some aspects, the techniques described herein relate to a solar coach light, wherein the shade assembly shields the light bulb from the environment over its entire periphery according to a horizontal plane.

In some aspects, the techniques described herein relate to a solar coach light, further including a PCB housed in the enclosure, and a switch connected to the PCB, wherein the switch allows to set an operating condition for the solar coach light.

In some aspects, the techniques described herein relate to a solar coach light, further including a PCB housed in the enclosure and electrically connected to the solar panel, the PCB including means configured to sense an energy level generated by the solar panel, where the PCB is configured to route energy between the solar panel, the battery cell and the socket based on the sensed energy level.

In some aspects, the techniques described herein relate to a solar coach light, wherein the hanging assembly includes an inset and an opening having a common shape, wherein inserting the inset in the opening provides a rigid interface.

In some aspects, the techniques described herein relate to a solar coach light including: a bracket to be mounted to a support surface, a light fixture configured to be releasably mounted to the bracket, the light fixture including: a plurality of top faces and a bottom face defining together an enclosure; a single solar panel; a battery cell housed in the enclosure; a socket mounted to the bottom face to plug a light bulb into, the socket electrically connected to the single solar panel and the battery cell; and a shade assembly mounted to the bottom face including a plurality of shades, the shade assembly defining a space surrounding the bottom face providing protection from the environment, wherein the plurality of top faces includes a front face configured to be most distant to the support surface, the front face having an area greater than other ones of the plurality of top faces, and the single solar panel being mounted to the front face.

In some aspects, the techniques described herein relate to a solar coach light, wherein the shade assembly includes a proximal periphery removably mounted to the bottom face, and a distal periphery providing a bottom opening to access the bottom face.

In some aspects, the techniques described herein relate to a solar coach light, wherein the shade assembly includes a frame on which the shades are removably mounted.

In some aspects, the techniques described herein relate to a solar coach light, further including a PCB housed in the enclosure, and a switch connected to the PCB, wherein the switch allows to set an operating condition for the solar coach light.

In some aspects, the techniques described herein relate to a solar coach light, further including a rubber cover covering a switch portion outside the enclosure and extending within the enclosure to cover at least partially another switch portion inside the enclosure thereby protecting the switch from the environment.

In some aspects, the techniques described herein relate to a solar coach light including: a bracket to be mounted to a support surface, a light fixture configured to be releasably mounted to the bracket, the light fixture including; a plurality of top faces and a bottom face defining together an enclosure; and a solar panel providing electrical power to the light fixture; and a hanging assembly connecting the light fixture to the bracket, the hanging assembly including an inset and an opening having a common shape, wherein inserting the inset in the opening provides a rigid interface whereby a center of gravity of the light fixture is not vertically aligned with the inset while still maintaining a desired vertical orientation of the light fixture. intensity wherein the solar coach light 100 is configured to provide more intense lighting. According to an embodiment, the switch 138 is covered with a rubber cover 194.

Figure 16:
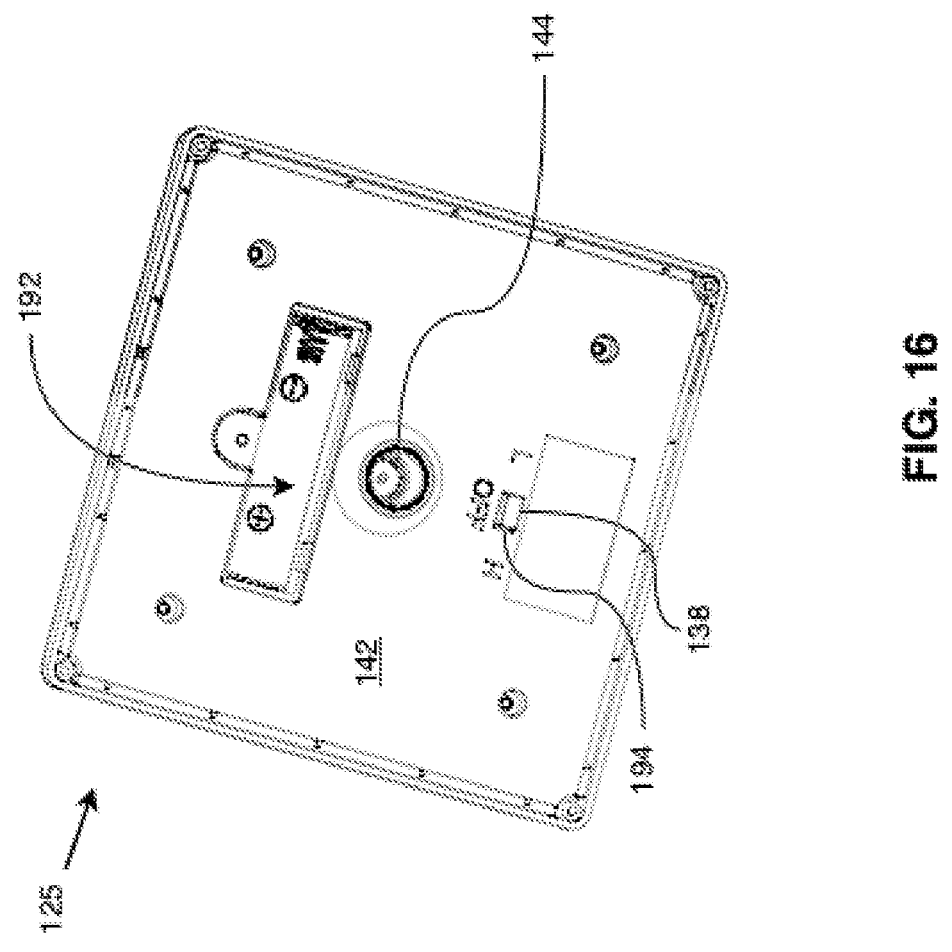
Figure 18:
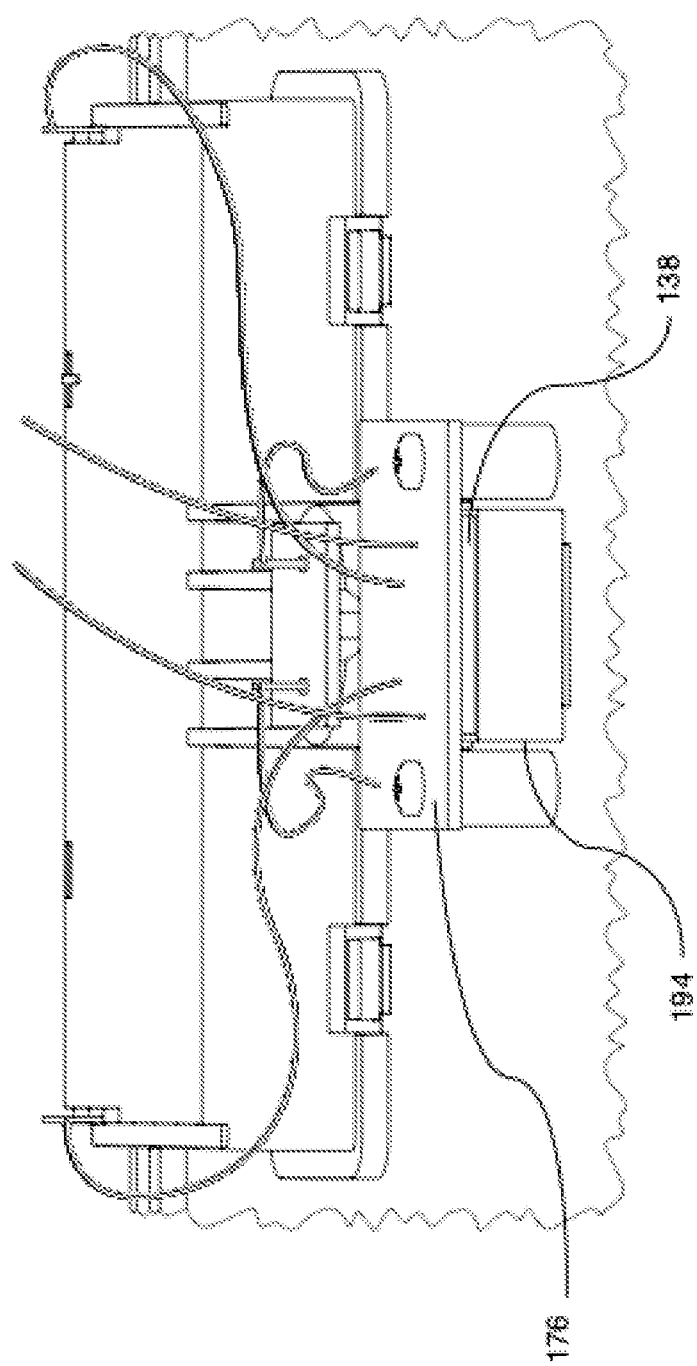
FIG. 18 is a perspective view of the PCB of the solar coach light of FIG. 1 with the switch.

Referring particularly to FIGS. 16 and 18, the rubber cover 194 is mounted to the switch 138, extending over most of the switch 138 which ending close to the PCB 176. The rubber cover 194 protects the electronic components and mechanical components (e.g., ball 196) from the environment, thereby increasing the life expectancy of the switch 138. According to an embodiment, the rubber cover 194 extends about the surface of the bottom face 142. According to a preferred embodiment, the rubber cover 194 extends upward beyond the surface of the bottom face 142, thereby the switch 138 features no unprotected surface below the surface of the bottom face 142.

According to a realization (not depicted), the switch 138 is a push button that, based on the push button being in the recessed position or extending position, is used to select the power to be transmitted to the light bulb 90.

According to realizations (not depicted), a console may comprise a plurality of switches and/or push buttons to control the power to be transmitted to the light bulb 90, the lighting triggering conditions, aka the level of ambient light under which the light bulb 90 may be powered, time settings, timer settings, controls associated with a movement sensor (when one is present), etc. According to realizations, some controls may be available only through wire/wireless connection of a control device (e.g., a smart phone).

Referring now to FIGS. 1 to 18, the bottom face 142 further comprises a socket 144 adapted to plug or screw a light bulb 90 into, wherein the light bulb 90 is preferably a LED light bulb 90. The socket 144 provides a possibility to the user to replace the light bulb 90 when worn off. The socket 144 provides a further possibility to customize the lighting by replacing the default light bulb 90 with a replacement light bulb 90 (fitting within the enclosed space under the bottom face 142) of different intensity, light color, and/or shape, or a programmable light bulb.

The bottom face 142 of the top assembly 125 features a removable door 146 providing access to the enclosure 148, and particularly to the battery cell 172 to easily replace it.

According to a preferred realization, the removable door 146 is kept in place with a screw 140.

The open bottom of the solar coach light 100 provides a space for a user to insert their hand to either change the light bulb 90, change the configuration of the solar coach light 100 by manipulating the switch, or change the battery cell 172 without having to dismount the solar coach light 100 or dismount a part of the solar coach light 100 while the shade assembly 150 keeps the electronic components protected from weather.

Accordingly, the solar coach light 100 is well adapted to be mounted to variable locations, on variable support surfaces, in variable orientations and angles without the need to connect the solar coach light 100 to the electric grid. The solar coach light 100 is adapted to self-adjust and self-stabilize when wobbling back to the best angle for the solar panel 135 to capture maximum light from the sun at the latitude for which the solar coach light 100 is designed, regardless of the angle of the arm 116 of the bracket 110 relative to the horizontal, aka a horizontal plane.

The solar coach light 100 is further adapted to face harsh weather conditions and particularly wind, preventing the environment from causing premature wear of the solar coach light 100. Particularly, the shade assembly 150 shields the bottom face 142 and the light bulb 90 from harsh weather.

The solar coach light 100 is further adapted for easy replacement or retrofit of components most probable to undergo premature wear, namely the rechargeable battery cell 172 and the light bulb 90.

According to an alternative embodiment (not depicted), the solar coach light 100 comprises a shim weighted and sloped to modify the slope of the light fixture 120 of plus or minus 5 degrees, wherein when the shim is mounted between the bottom face 142 and the frame 152, the combined weight of the light fixture 120 with the shim results in the light fixture 120 having its front sloped face 132 adjusted 5 degrees closer or farther from the horizontal while the top of the frame 152 remains mounted horizontally.

Furthermore, with this embodiment, the socket 144 is adjustable to have the light bulb 90 normally vertical independently of the angle of the bottom face 142.

A method of installation of the solar coach light 100 comprises to mount the bracket 110 to a wall. The installation further comprises to prepare the shade assembly 150 by mounting the shades 154 into the frame 152, and if designed to, to mount the cap 162 to the frame 152. The method comprises to insert the rechargeable battery cell 172 and to close and secure the removable door 146 if needed. The method comprises afterwards to mount the shade assembly 150 to the top assembly 125. The method comprises to mount the top assembly 125 to the bracket 110 and secure it in place with the pin 114. The method comprises, somewhere during the preparation or at the end, to screw the light bulb 90 in place.

Accordingly, the method of installation may be summarized in mounting the bracket 110, preparing the light fixture 120 and mounting the light fixture 120 to the bracket 110.

According to alternative embodiments, the method may comprise to optimize the orientation of the light fixture 120 to be subject to more direct sunlight, e.g., through adjustment of slope and/or orientation toward the South.

According to alternative embodiments, the method may comprise to set configurations either physically on the light fixture 120 and/or through a connected device.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A solar coach light comprising:
a bracket to be mounted to a support surface, the bracket comprising a mounting plate and an arm extending therefrom;
a light fixture comprising:
a plurality of top faces and a bottom face defining together an enclosure;
a solar panel mounted to one of the top faces;
a battery cell housed in the enclosure;
a socket mounted to the bottom face to plug a light bulb into, the socket electrically connected to the solar panel and the battery cell; and
a removable shade assembly mounted to the bottom face comprising a plurality of removable shades, the removable shade assembly defining a space surrounding the bottom face providing protection from the environment; and
a hanging assembly connecting the light fixture to the arm distant from the mounting plate, the hanging assembly comprising an inset and an opening having a common shape, wherein inserting the inset in the opening provides a rigid interface whereby a center of gravity of the light fixture is not vertically aligned with the inset while still maintaining a desired vertical orientation of the light fixture.

2. The solar coach light of claim 1, wherein the plurality of top faces comprises a front face to which the solar panel is mounted, the front face being sloped relative to a horizontal plane.

3. The solar coach light of claim 2, wherein the plurality of top faces comprises at least one other face, wherein the front face has a greater area than the at least one other face.

4. The solar coach light of claim 1, wherein the removable shade assembly comprising a bottom opening.

5. The solar coach light of claim 1, wherein the removable shade assembly comprises a frame on which the removable shades are removably mounted.

6. The solar coach light of claim 5, wherein the frame has one of a groove, a lip and a blade configured to limit inward displacement of the removable shades relative to the frame.

7. The solar coach light of claim 5, wherein the frame has a proximal periphery comprising a series of first segments, the proximal periphery being configured to be mounted to the bottom face, and a distal periphery comprising a series of second segments, and wherein the second segments are shorter than the first segments.

8. The solar coach light of claim 7, wherein the removable shades have a trapezoidal shape.

9. The solar coach light of claim 7, wherein the removable shade assembly comprises a cap mounted to the proximal periphery of the frame.

10. The solar coach light of claim 9, further comprising blades mounted to the cap configured to butt up against the removable shades to press the removable shades towards the distal periphery and outwardly.

11. The solar coach light of claim 1, wherein the shade assembly shields the light bulb from the environment over its entire periphery according to a horizontal plane.

12. The solar coach light of claim 1, further comprising a PCB housed in the enclosure, and a switch connected to the PCB, wherein the switch sets an operating condition for the solar coach light.

13. The solar coach light of claim 1, further comprising a PCB housed in the enclosure and electrically connected to the solar panel, the PCB comprising a sensor configured to sense an energy level generated by the solar panel, where the PCB is configured to route energy between the solar panel, the battery cell and the socket based on the sensed energy level.

14. A solar coach light comprising:
a bracket to be mounted to a support surface, a light fixture configured to be releasably mounted to the bracket, the light fixture comprising:
a plurality of top faces and a bottom face defining together an enclosure;
a solar panel;
a battery cell housed in the enclosure;
a socket mounted to the bottom face to plug a light bulb into, the socket electrically connected to the solar panel and the battery cell; and
a shade assembly mounted to the bottom face comprising a plurality of shades, the shade assembly defining a space surrounding the bottom face providing protection from the environment, wherein the plurality of top faces comprises a front face configured to be most distant to the support surface, the front face having an area greater than other ones of the plurality of top faces, and the solar panel being mounted to the front face, and
a hanging assembly releasably connecting the light fixture to the bracket, the hanging assembly comprising an inset and an opening having a common shape, wherein inserting the inset in the opening provides a rigid interface whereby a center of gravity of the light fixture is not vertically aligned with the inset while still maintaining a desired vertical orientation of the light fixture.

15. The solar coach light of claim 14, wherein the shade assembly comprises a frame on which the shades are removably mounted.

16. The solar coach light of claim 14, further comprising a PCB housed in the enclosure, and a switch connected to the PCB, wherein the switch sets an operating condition for the solar coach light.

17. The solar coach light of claim 14, wherein the shade assembly comprises a proximal periphery removably mounted to the bottom face, and a distal periphery providing a bottom opening to access the bottom face.

18. The solar coach light of claim 14, further comprising a rubber cover covering a switch portion outside the enclosure and extending within the enclosure to cover at least partially another switch portion inside the enclosure thereby protecting the switch from the environment.

19. A solar coach light comprising:
a bracket to be mounted to a support surface, a light fixture configured to be releasably mounted to the bracket, the light fixture comprising:
a plurality of top faces and a bottom face defining together an enclosure;
and a solar panel providing electrical power to the light fixture; and
a hanging assembly connecting the light fixture to the bracket, the hanging assembly comprising an inset and an opening having a common shape, wherein inserting the inset in the opening provides a rigid interface whereby a center of gravity of the light fixture is not vertically aligned with the inset while still maintaining a desired vertical orientation of the light fixture.

* * * * *